Patented Apr. 5, 1932

1,852,532

UNITED STATES PATENT OFFICE

MICHAEL LEVIN, OF BROOKLYN, NEW YORK, ASSIGNOR TO ALBERT M. DAVIS, OF BOSTON, MASSACHUSETTS

ADHESIVE

No Drawing. Application filed December 30, 1925. Serial No. 78,335.

This invention relates to new adhesive compositions containing a coagulable blood proteid. In the various arts involving the use of adhesives, air drying or air setting adhesive compositions and cements at the present time are being displaced by compositions giving quicker operation and better adapted to mass scale production. Experience has shown that for this purpose it is best to use compositions containing active components coagulating or setting under the action of heat. And I have found that commercial blood albumen is particularly well adapted for production of heat hardening cements or adhesives. Blood albumen as it is found in commerce may however in some instances be somewhat objectionable because of its dark color; as for example in adhesives to be used in connection with food containers. Blood albumen further has a tendency to decompose rapidly and to putrefy unless handled carefully. The dark color can be reduced by admixture with light colored commercial proteids.

I have found that under the present invention an adhesive may be made involving the use of blood albumen which may be used without any objectionable or detrimental effect of using these ingredients by themselves, as adhesives particularly in connection with containers in which food products are packed, such as packing cans or the like or for containers such as bottles for soft drinks, beverages or the like, without imparting to the same any objectionable odor or deteriorating effect; or which may be set or hardened to bind articles such as layers of paper, particles of cork or paper products to wood, cork products to metal, by a hardening operation equivalent to that involving heat or by a flocculation or coagulation process.

I have further found that I can produce an adhesive involving the use of the cheapest grade of blood albumen, known commercially as black or dark blood albumen which is freed of the ordinary objectionable dark color characteristic of such a product by combining therewith an agent which has a lightening or whitening effect upon the color of the same without adversely affecting its adhesive properties but which, to the contrary, has the highly desirable characteristics of being susceptible to setting, drying and/or hardening by flocculation and/or heat treatment which will have higher binding qualities and increased speed of setting or hardening. I have further found that I may produce an adhesive containing blood albumen in which water is a vehicle; and that by adding thereto an ammoniated aqueous dispersion of rubber, preferably latex, I obtain an adhesive which is free of the objectionable dark or black coloration of blood albumen. This further has the effect of bleaching the blood albumen and producing an adhesive which is non-putrefactive, will not decompose and will still retain the desirable heat setting qualities. I have still further found that a mixture as above described will set and/or harden and produce a binding effect by processes other than those involving heat, such as, for instance, chemical or electrical flocculation or coagulation; that these ingredients when so combined may be made to carry a high content of solid components such as fillers, incipient adhesive materials, such as rubber without materially exceeding the viscosity necessary for cementing processes such as uniting layers of sheeted material, particles of granular material, particles of cork, dissimilar materials such as wood and paper, cork and metal, metal and paper, and metal and cork or compositions thereof.

I have still further found that a combination of ingredients such as blood albumen, water and latex will produce an adhesive which, aside from having the desirable properties previously described and from overcoming the objections regarding the use of blood albumen, may be set, hardened and be made use of to produce a binding effect with a speed of operation heretofore unattainable, so that not only will there be produced a material of exceedingly low cost because of the ingredients used but in which there is considerable saving by diminishing the cost attendant in its use, processes or manipulation involving in its manufacture.

My invention, therefore, has as an object thereof the provision of an adhesive including blood albumen and an agent which will induce better and speedier solution thereof; the provision of an adhesive including commercial blood albumen, dark or black in color combined with an ingredient which has a whitening effect thereon and which will render the same substantially non-putrefiable or liable to decomposition or to become otherwise objectionable because of the taste and odor of its decomposition products; the provision of an adhesive including blood albumen and an agent such as ammonia and water which will have a bleaching effect upon the blood albumen: the combination with blood albument of an agent acting as an efficient vehicle in the art to which this invention relates for rubber or the dispersion products thereof or suspension thereof such as latex; the provision of an adhesive including blood albumen and latex in a mobile carrier or vehicle therefor as a combination having the property of being set and/or, hardened and/or coagulated by processes involving heat or of being set, hardened or otherwise coagulated by flocculating means or agents above referred to; the provision of an adhesive including blood albumen and ammoniated latex in such proportions as to produce a product having a desirable coloration not present or heretofore obtainable by the use of blood albumen and in which the blood albumen is bleached; the provision of an adhesive including blood albumen and ammoniated latex which may be used as a binding agent for dissimilar materials such as cork and metal, without having a blackening or discoloring effect upon the cork or metal; the provision of an adhesive including blood albumen and a dispersion of rubber which may be used with any processes involving heat for causing setting or hardening of the adhesive agent without the objection involved in driving off the water vehicle but one in which a large proportion of the water content acts as a component in the final product; the provision of an adhesive including blood albumen and latex which when coagulated, set or otherwise hardened will be unaffected by the vehicle which is previously used to disperse the same and is particularly non-decomposable due to swelling by reason of the action of water thereon or putrefaction; the provision of an adhesive including blood albumen or dispersions of rubber, colloidal suspensions thereof such as latex, characterized by low cost due to the use of inexpensive ingredients and possible speed of operation when used as a binding agent.

As illustrative of my material, blood albumen, such as found on the market as a granular product, either the light colored one or the dark product almost approaching black, is gelatinized or swelled in water. To this mixture may be added an additional quantity of water to thin the same. A mixture containing rubber is then added which, in my preferred form, is latex. The latex used is one which has been rendered substantially non-coagulable in storage by the addition of a protective colloid. Preferably the latex that is used is alkaline, which is so rendered by the addition of ammonia.

A mixture thus made will be found to have highly adhesive properties, and to be free from the objectionable color due to the use of blood albumen. In fact the dark color of blood albumen will disappear in a way that is almost characteristic of a bleaching action. This product will also be found to set, harden or coagulate by flocculation processes, involving chemical, electrical or other agencies such as, for instance, heat treatment, and that when it sets, and/or hardens and/or coagulates will show very slight loss in volume and further to have the properties of preventing putrefaction and decomposition of the blood albumen. The resultant product will also be found to be substantially unaffected by water and proof against decomposition by soft drinks or carbonated beverages or drinks containing salines such as those known, as "white rock" and "pluto water," "ginger ale" or the like.

As a more specific example of an adhesive made in accordance with my invention, 700 grams of blood albumen is mixed with about 700 grams of water. The resultant mixture is permitted to stand so as to cause a thorough swelling of the blood albumen. I have found that permitting the mixture to stand over night will produce the desired effect. Following this treatment, an additional quantity of water is added to bring the total amount of water added to about 1300 grams. This mixture will have sufficient fluidity to be capable of filtering and this is done to remove any solid particles. There is then added a quantity of latex (preferably ammoniated) in an amount equivalent to about 130 to 200 grams. Mixing is then effected to produce a homogeneous product. This product will have all the desirable properties previously described, making it especially valuable for an adhesive.

As a further example of a composition suitable for use in binding cork disks to the crown sealing means of bottle closures, the following procedure may be practiced. Rubber, preferably uncured, is masticated on a rubber mixing mill and then there is incorporated blood albumen in a manner similar to the incorporation of inert fillers. A mixture of equal parts by weight of blood albumen and rubber will be found suitable for this purpose. This mixture is broken on the mixing rolls for a period of about ½ hour and then there is added a quantity of water to make a suspension. Where I use approximately 150 grams of blood albumen to 150 grams of rubber there is added on the mixing rolls during the mixing process about 1500 grams of water. A rubber-blood albumen dispersion is thus obtained, suitable for the purposes described and capable for use in the manner previously set forth.

In general, I have found that if there is added to a blood albumen dispersion an amount of rubber mixture, preferably latex, in quantity sufficient to give it a primary adhesive character due to its inherent properties, a function will be served sufficient for my purpose particularly where the adhesive is to be used as hereinafter described. In a process wherein the adhesive is to be applied by a spreading device, the rubber content is not present in quantity sufficient to interfere with this spreading action. For this purpose I have found that 8 pounds of blood albumen, 15 pounds of water and 2 pounds of latex (about 30% rubber) will give excellent results.

The water content is maintained in quantity sufficient to completely swell or dissolve the blood albumen. In the above cited example, though I have described an amount of latex or rubber suspension of 2 pounds, this quantity may be reduced below 2 pounds and increased within wide limits such as, for example, from one pound to 72 pounds of latex. This will still give an adhesive having desirable, workable characteristics. Where rubber in the form of a suspension or the latex thereof is used, an amount may be added so that the rubber content is equivalent to 3 parts of rubber solids to 1 part of blood albumen. This proportion of rubber to blood albumen may be varied from the lower limit to the upper limit, depending upon the characteristics that it may be desired to give to the adhesive. The rubber, where the uncured product is used, as in latex, acts as a primary adhesive and where it is desired to increase the primary binding character of the adhesive, the amount of rubber component is increased to the upper limit, depending upon the particular method of application. Where the adhesive is to be applied by spreading, the rubber dispersion component is increased in quantity whereas where the adhesive is to be applied as in a molding process, the primary binding action of the adhesive may be increased and for this purpose the rubber solids component is decreased in quantity.

I have found that by my adhesive, I may make use of the primary binding action of the rubber to speed up the process of molding or lessen the time in which the body material is retained within the mold. By reason of the fact that I obtain a primary binding effect, due to the rubber, a mass of material may be formed in a mold and removed with retention of its shape for a sufficiently long time to carry out the final hardening step elsewhere as by heating outside the mold. By thus shortening the time for retaining the mass within the mold, greater use is made of the mold as larger quantities of material may be molded within a period of time.

In the above cited examples, it will be observed that the blood albumen solution forms the continuous phase of the mixture whereas the rubber, particularly where latex is used, is in the internal or dispersed phase. However, where it is desired that a high primary binding effect be had, the rubber may be in the continuous phase and the blood albumen solution in the internal or dispersed phase. In this case, to produce such a mixture the rubber is preferably first dissolved in some solvent therefor, such as benzol, and into this solution there is added the other component, that is, blood albumen, so as to disperse the latter into the rubber.

Though this mixture and that previously described in which blood albumen is used as a component will keep indefinitely without putrefaction or decomposition, in some instances, particularly where a low grade of blood albumen is used and for purposes which will be obvious to those skilled in the art, I have found it desirable to add an antiseptic such as sodium benzoate, carbolic acid, formaldehyde or isomers thereof.

An adhesive made in accordance with the method outlined above will be found to be, so far as its color is concerned, almost white and free from the dark coloration natural to blood albumen; it will be waterproof, non-putrefiable; it will have sufficiently low viscosity for proper manipulation and processing; when subjected to heat it will quickly coagulate, harden and set without substantial shrinkage or loss of volume ordinarily accompanying drying. Further, other means than heat may be utilized alternatively or combined in setting or coagulating the material to produce its desired function and for this purpose chemical flocculating agents or coagulating agents may be used, such as acetic acid, sulphuric acid or the like or any strong electrolyte. In certain instances it has been found desirable to cause setting, coagulating or hardening by agents other than heat, as for instance, by passing an electrical current therethrough the deposit taking place adjacent the anode of the electrodes.

An adhesive made in accordance with my process above outlined also has the desirable properties of being capable of being set quickly; a shorter time being necessary for producing hardening thereof than with previously prepared heat reactive products.

Where my product is made use of for cementing the cork disks to the metal seals in crown sealing agents for bottles or the like, I have found that the cementing process can be much more quickly effected than with other cements and a period of 2 seconds at a temperature of 200° F. will produce the necessary hardening effect. However, it will be understood that a shorter period of time at higher temperatures or a longer period of time at lower temperatures may equally well be used. It will thus be observed that for this purpose, by using my adhesive, rapidity of binding may be effected in a manner not heretofore attainable. When thus used, my adhesive does not have an objectionable discoloring effect upon the metal parts or a darkening effect upon the cork. Nor will a disk made in this manner be affected by the beverage contents of the bottle or container. It will be found particularly suitable for beverages having a saline content such as "white rock water," "pluto water" or "ginger ale." In those cases where it is particularly desirable to keep the beverages crystal clear, it is found that no reaction will take place between the contents of the container and the binding agent to decompose the cork and deposit within the bottle particles of cork or other material used in the sealing member.

Having thus described my invention and illustrated its use, what I claim as new and desire to secure by Letters Patent is:

1. An adhesive comprising an aqueous dispersion of rubber and blood albumen.

2. An adhesive comprising latex and blood albumen.

3. An adhesive comprising latex about two pounds, blood albumen about eight pounds and water about fifteen pounds.

4. An adhesive comprising an aqueous dispersion of rubber and blood albumen, the blood albumen being present in proportions of one part blood albumen to three parts of rubber solids.

5. An adhesive containing eight pounds of blood albumen and from one to seventy two pounds of an aqueous dispersion of rubber comprising ammoniated latex.

6. An adhesive comprising a substantially free flowing mixture containing coagulable albuminous material eight pounds and an aqueous dispersion of rubber comprising ammoniated latex one to seventy two pounds.

7. An adhesive comprising an aqueous dispersion of rubber and albumen, the albumen being present in sufficient quantities to cause the mixture to be rigid upon the application of a temperature of about 200° F.

8. As a new material, stabilized latex containing blood proteid.

9. As a new material, stabilized latex containing the "red end" of blood.

10. As a new article of manufacture, latex containing a dissolution product comprising dark or black blood albumen.

11. As a new article of manufacture, latex containing dark or black blood albumen, the blood albumen and the rubber solids being contained in proportions of not more than one part blood albumen to three parts rubber solids.

12. As a new article of manufacture, a rubber dispersion containing a dissolution product comprising black blood albumen.

13. As a new article of manufacture, a rubber dispersion containing dark or black blood albumen, the blood albumen and the rubber solids being contained in proportions of not more than one part blood albumen to three parts rubber solids.

14. As a new article of manufacture, an alkaline aqeuous dispersion of rubber and blood albumen.

15. As a new article of manufacture, an alkaline dispersion of rubber comprising latex containing the dissolution product of blood albumen.

In witness whereof I have signed and sealed this specification, this 28th day of November, A. D. 1925.

MICHAEL LEVIN.

CERTIFICATE OF CORRECTION.

Patent No. 1,852,532.  Granted April 5, 1932, to

MICHAEL LEVIN.

It is hereby certified that error appears in the printed specification of the above numbered patent requiring correction as follows: Page 1, line 97, before "processes" insert the words and in, and line 98, strike out the word "in"; page 2, line 15, for the misspelled word "albument" read albumen, line 18, for "suspension" read suspensions, and line 24, before the word "hardened" insert the words and/or; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.